March 15, 1966 W. V. SLOMINSKI 3,240,483
SPRING ASSEMBLIES
Filed Sept. 30, 1963 3 Sheets-Sheet 1
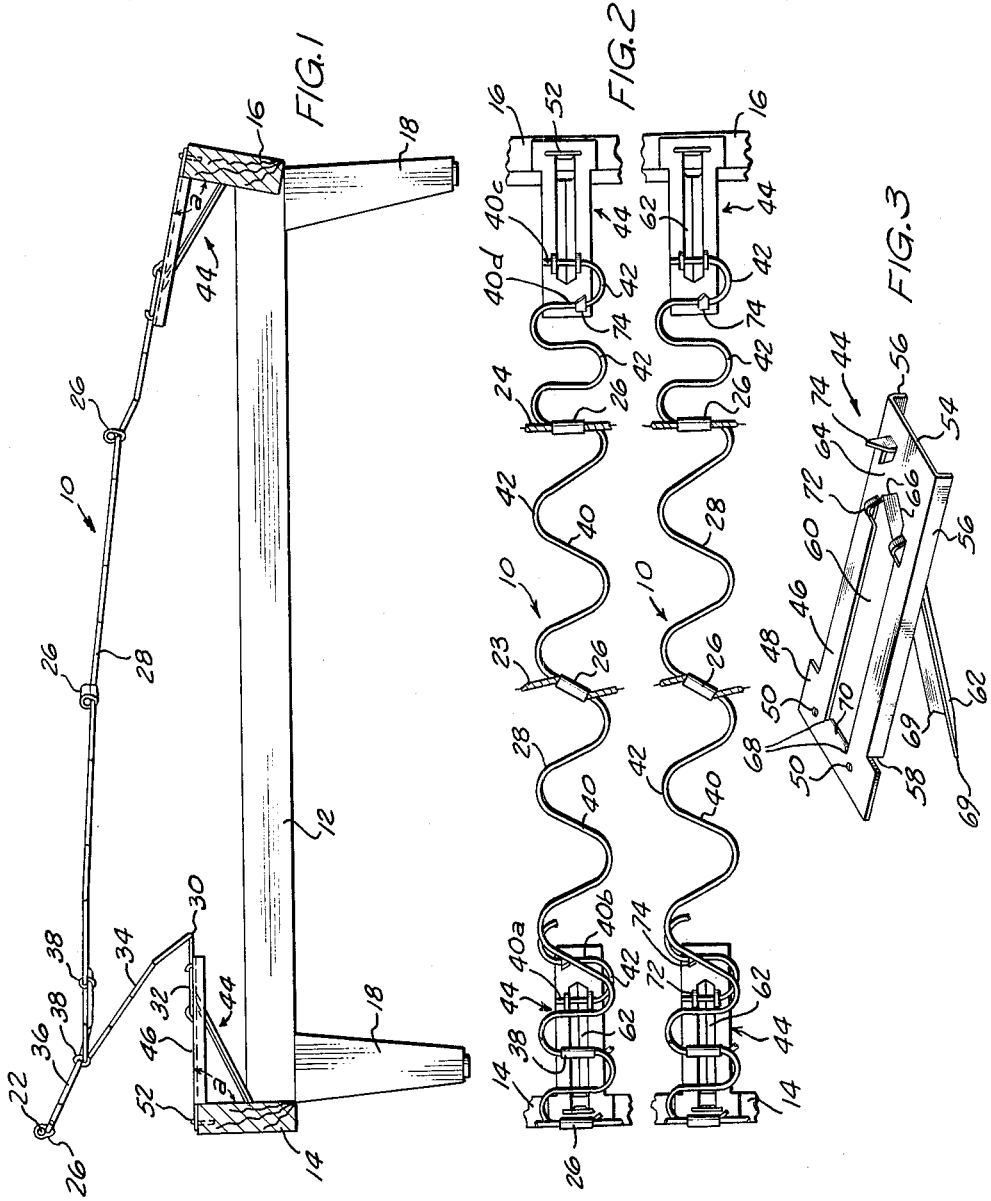
INVENTORS
WALTER V. SLOMINSKI
GEORGE F. JANKO
BY
Olsen and Stephenson
ATTORNEYS March 15, 1966 W. V. SLOMINSKI 3,240,483
SPRING ASSEMBLIES
Filed Sept. 30, 1963 3 Sheets-Sheet 2

INVENTORS
WALTER V. SLOMINSKI
GEORGE F. JANKO
BY
Olsen and Stephenson
ATTORNEYS

March 15, 1966 W. V. SLOMINSKI 3,240,483
SPRING ASSEMBLIES
Filed Sept. 30, 1963 3 Sheets-Sheet 3

INVENTORS
WALTER V. SLOMINSKI
GEORGE F. JANKO
BY
Olsen and Stephenson
ATTORNEYS

United States Patent Office 3,240,483
Patented Mar. 15, 1966

1

3,240,483
SPRING ASSEMBLIES
Walter V. Slominski, Garfield Heights, Ohio, and George F. Janko, Georgetown, Ky., assignors to Hoover Ball and Bearing Company, Saline, Mich., a corporation of Michigan
Filed Sept. 30, 1963, Ser. No. 312,459
14 Claims. (Cl. 267—102)

This invention relates generally to wire spring assemblies for upholstered seat structures, and more particularly to spring assemblies having improved apparatus for mounting the springs on supporting frames.

Many upholstered seating structures are made by mounting preformed spring assemblies on a supporting frame, and one of the problems involved in the manufacture of these seating structures is the attachment of the spring assemblies to the frame. An attaching structure which is easy to apply, economical to manufacture, flexible in application to various springs, and capable of preassembly with the springs is desirable for the purpose of facilitating assembly of the seating structures and reducing the final cost thereof. Also, some upholstered seating structures are designed with a "chord distance," namely, the straight line distance between the spring supporting rails, sufficiently great that elongated spring structures cannot be extended between the rails without undesirably large deflections in the springs and a corresponding reduction in the desired stiffness of the load supporting portion of the seat structure. As a result, in seating structures of this type it has been necessary in the past to add auxiliary frame rails, thereby adding significantly to the final cost of the seat structure and adding to the complexity and weight of the frame. It is an object of this invention, therefore, to provide an improved mounting bracket for attaching wire springs to a supporting frame which is easy to install, can be cantilever mounted, is adjustable with respect to the effective length thereof, is economical to manufacture, and can be preassembled with a spring; and to provide a spring assembly which includes a bracket support that can support the spring without the necessity for auxiliary frame rails, and cantilever supports the spring so as to shorten the effective chord distance over which deflection of the spring can occur.

In the spring assembly of this invention, elongated wire springs, of "sinuous wire," which is shown in the drawing, or "formed wire," which is well known and is illustrated, for example, in FIGS. 4 and 5 of U.S. Patent No. 3,095,189, owned by the assignee of this application, are used. Both sinuous wire and formed wire have transverse cross wire portions adjacent ones of which are connected by connecting wire portions. Both types of springs have a resilient resistance to lateral bending characteristic and are described herein generically as "zigzag springs," so that, as used herein, the term "zigzag spring" is inclusive of both "formed wire" and "sinuous wire" springs.

A main zigzag spring of a length to substantially span the distance between a pair of frame rails on which the seat structure is to be supported is attached to cantilever supports which are mounted on the rails so that they extend inwardly toward each other. Each cantilever support consists of a bracket which is attached at one point to a frame rail and is engaged with the frame rail at another point so that the bracket is restrained against pivoting under load. Each bracket is in turn engaged with at least two longitudinally spaced portions of the main spring member so as to support the spring and at the same time restrain the spring against pivotal movement at its support. As a result, the main spring member is not only attached in an economical and easy manner to the frame rails, but the effective chord distance over which the spring can deflect is also reduced to the distance between the spring supporting portions of the brackets. The size of the brackets and the points at which they are engaged with the spring can be dimensioned to provide the desired effective chord distance, and in some embodiments of the invention the bracket is adjustable at installation to desirably locate its spring supporting portion. Also, the support brackets can be preassembled with the main spring members so that the resulting spring assemblies can be quickly mounted at the desired positions on the supporting frame.

Further objects, features and advantages of this invention will become apparent from a consideration of the following description, the appended claims, and the accompanying drawing in which:

FIGURE 1 is a transverse sectional view of a seating structure frame having a spring assembly of this invention mounted thereon;

FIGURE 2 is a fragmentary plan view of the assembly shown in FIG. 1, with some parts broken off and removed for the purpose of clarity;

FIGURE 3 is a perspective view of the preferred form of spring mounting bracket which forms a part of the spring assembly of this invention;

Figure 4:
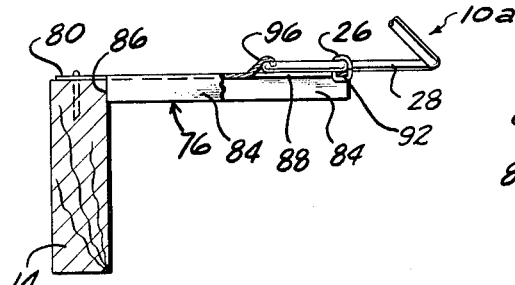
FIGURE 4 is a foreshortened sectional view, illustrated similarly to FIG. 1, illustrating a modified form of the spring assembly of this invention.

With reference to the drawing, the preferred form of the spring assembly of this invention, indicated generally at 10, is illustrated in FIG. 1 mounted on a seating structure frame 12 which is illustrated as including front and rear frame rails 14 and 16, respectively, and supporting legs 18. A plurality of spring assemblies, which are identical and only one of which appears in FIG. 1, are mounted in a side-by-side spaced relation on the frame rails 14 and 16, as illustrated in FIG. 2, with the spacing between the assemblies 10 being determined by the desired supporting characteristics in the particular seating structure. The assemblies 10 are connected by a border wire 22 and tie wires 23 and 24 which are connected to the assemblies 10 by conventional spring clips 26.

Each of the spring assemblies 10 consists of a main spring member 28 which is of a length to substantially span the distance between the frame rails 14 and 16, and which is bent to a desired configuration. In the illustrated form of the main spring member 28, it is bent so that at its front end it has a V-shaped portion 30, which is commonly referred to as a "fish mouth" portion, having a substantially horizontal leg 32 and an upwardly and forwardly inclined leg 34 which can deflect downwardly toward the leg 32 to impart the desired resilience to the main spring member 28 at the front edge of the seat structure. An edge wire spring member 36, secured by clips 38 to the main spring member 28, projects forwardly and upwardly and is secured at its front end to the border wire 22 at a position spaced above and in substantially vertically alignment with the front frame rail 14.

The main spring member 28, which is illustrated as being formed of sinuous wire, but which can also be formed of formed wire, has cross wire portions 40 which are spaced longitudinally of the main spring member 28 and are connected by generally U-shaped connecting wire portions 42. The main spring member 28 is also illustrated (FIG. 2) as being stretched longitudinally in certain portions relative to other portions so that the spacing between adjacent cross wire portions 40 varies over the length of the main spring member 28. During loading of the main spring member 28 the cross wire portions 40 function as torsion bars to impart the resilient resistance to lateral deflection desired in the spring 28. By forming the main spring member 28 so that the spacing between the cross wire portions 40 is varied, the relative stiffness of longitudinally spaced portions of the spring member 28 can be adjusted to provide the spring with the desired deflection characteristics, as explained in Patent No. 2,639,763 owned by the assignee of this application.

The front end of the main spring member 28, which forms the leg 32, terminates in an endmost cross wire portion designated 40a and the cross wire portion adjacent thereto is designated as 40b for convenience of description. The rear end of the main spring member 28 terminates in a cross wire portion which is hereinafter designated 40c and the cross wire portion adjacent thereto is designated 40d.

A pair of identical cantilever supports, consisting of brackets 44, are shown in FIG. 1 for supporting both the front and rear ends of the main spring member 28 on the frame rails 14 and 16. It is to be understood, however, that it is within the purview of this invention to support only the front or rear end of the main spring member 28 on one of the rails 14 or 16 with a bracket 44 and support the other end in any different desired manner. A bracket 44 is shown in FIG. 3 as consisting of a unitary body 46 formed from a single rectangular piece of material which may be either metal or plastic. The body 46 has a flat, generally rectangular end portion 48 which is provided with holes 50 through which a staple 52 or nails are driven to attach the bracket end portion 48 to the top side of a frame rail 14 or 16 as shown in FIGS. 1 and 2. Between the end portion 48 and the opposite end 54, the body 46 is formed with a pair of downturned edge flanges 56. One end 58 of each flange 56 is located adjacent the body end portion 48.

Between the flanges 56, an elongated slot 60 is formed in the body 46 by bending a leg 62 downwardly from the body 46 so that the leg 62 is integral with the portion 64 of the body 46 which is adjacent the end 54. The leg 62 is of a substantially V-shape in cross section, so as to increase the stiffness of the leg 62, and as a result, the bend lines 66 at the juncture of the leg 62 and end portion 64 of the body 46 are also of generally V-shape. The slot 60 is formed so that at the slot end adjacent the body end portion 48, notches 68 are formed. This results in a pair of pointed projections 69 on the terminal end of leg 62. Between the notches 68, a tab 70 is formed which is bent downwardly so that it will bite into the frame rail when the bracket 44 is mounted thereon. Adjacent the opposite end of the slot 60, where the bend lines 66 are formed, the body 46 is formed with a pair of substantially aligned upwardly extending loop or spring retainer portions 72 which are of generally inverted V-shape or U-shape and are disposed on opposite sides of the slots 60. Each loop portion 72 is formed by cutting and bending upwardly a narrow strip of material in body 46 at the side of slot 60. An upwardly extending tang, cut from the body 46, is positioned generally between the loops 72 and the body end 54 at a position closer to one of the flanges 56 than to the other.

The main spring member 28 can be mounted on the frame rails 14 and 16 by either first attaching the main spring member 28 to a pair of brackets 44 and then attaching the brackets 44 to the frame rails 14 and 16, or the brackets 44 may be first mounted on the frame rails 14 and 16 following which the main spring member 28 is attached to the brackets. A bracket 44 is attached to the front end of the main spring member 28 by extending the cross wire portion 40a through the aligned bracket loops 72 and positioning the adjacent cross wire portion 40b in contact with the tang 74 and then bending the tang downwardly so as to clamp the cross wire portion 40b against the body 46. The rear end of the main spring member 28 is similarly attached to a bracket 44 by extending the cross wire portion 40c through the aligned bracket loops 72 and bending the tang 74 downwardly so as to clamp the cross wire portion 40d against the body 46.

The brackets 44, when attached to the ends of a main spring member 28, are then positioned on the top sides of the frame rails 14 and 16 so that the flange ends 58 engage the inner sides of the frame rails 14 and 16. Staples 52 are then driven through the openings 50 to secure the bracket end portions 48 to the top sides of the rails and so as to force the tabs 70 into biting engagement with the top sides of the rails. The free ends of the legs 62 on the brackets 44 are positioned in engagement with the inner sides of the rails 14 and 16 so as to brace the brackets 44 and positively preclude downward deflection of the brackets. The extent to which the legs 62 are bent downwardly determines the angle, indicated at "a" in FIG. 1, that the body 46 will take with respect to the frame rail on which it is mounted. As a result, the leg 62 is adjustable to provide the desired angle "a" and thereby obtain the desired position of main spring member 28 and the desired deflection characteristics of the main spring member 28. Also, the adjustability of the leg 62 provides for adjustments of the brackets 44 to accommodate slight variations in length of the main spring members 28.

It is desirable, for strength of attachment purposes, to locate the tang 74 so that it engages a cross wire portion 40b at a position spaced as far as possible from the connecting wire portion 42 extending between the cross wire portions 40a and 40b. For this reason, the tang 74 is positioned closer to one flange than to the other. Preferably, therefore, the tang 74 engages the cross wire portion 40b at the location shown in FIG. 1. It is also desirable to have all brackets 44 identical, and it would be preferable, therefore, to have the cross wire portions 40c and 40d connected at the ends opposite to that illustrated in FIG. 1, which merely shows that when necessary, the tang 74 may be located as shown, although this is not preferred.

It can thus be seen that the brackets 44 are economically formed from a single rectangular piece of metal or plastic, are readily preassembled with the main spring members 28 to provide spring assembly 10 which can be quickly mounted on the frame rails 14 and 16 and which are adjustable to obtain the desired positions and characteristics of the spring assemblies 10. By virtue of the brace leg 62 and the brace flanges 56 in each bracket 44, it is firmly cantilever supported on its frame rail in an adjustable manner so as to reduce the effective chord distance of the main spring member 28 to the distance between the tangs 74 on the supporting brackets 44 at opposite ends of the main spring member 28. As a result, the spring assemblies 10 may be utilized in seating structures in which the spacing between the rails 14 and 16 is such that auxiliary frame rails have heretofore been required to prevent undesirably large deflections of the main springs 28.

The spring assemblies illustrated in FIGS. 4, 6, 8, 11 and 13 are similar to the spring assmbly 10 just described differing primarily in the particular brackets utilized for supporting the main spring members. Consequently, in illustrating and describing the modified spring assemblies, only the front ends of the main spring members, and the supports therefor on the front frame rail 14, are illustrated and described, it being understood that the rear ends of the main spring members are similarly mountable on the rear frame rail 16.

Figure 5:
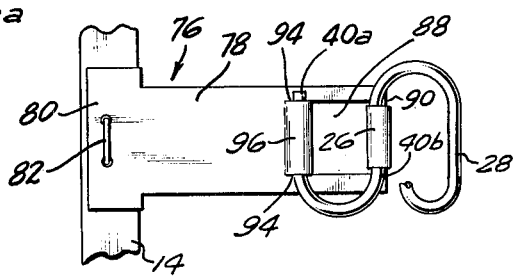
FIGURE 5 is a fragmentary top view of the structure illustrated in FIG. 4.

The spring assembly 10a illustrated in FIGS. 4 and 5 employs a main spring member 28 identical to the spring member 28 previously described. A bracket 76 is assembled with the main spring cross wire portions 40a and 40b and is attached to the top side of the front frame rail 14. The bracket 76 is formed from a flat rectangular body 78 having an end portion 80 secured by a staple 82 to the top side of the frame rail 14. A pair of downturned flanges 84 on the body 78 have their ends 86, which are disposed adjacent the end portion 80, engaged with the innerside of the frame rail 14. A slot 88 is formed in the body 78 adjacent the end 90 thereof which is remote from the supporting end portion 80. The slot 88 is formed at a position such that a narrow strip 92 is formed in the body 78 between the end 90 and the slot 88. At the opposite end of the slot 88, the body 78 is cut, as indicated at 94, so as to extend two sides of the slot 88 toward the body end portion 80. The body member 78 between the cuts 94 is then bent upwardly so as to form a loop shape retainer 96 at the end of the slot 88 opposite the end at which the strip 92 is formed. The main spring member 28 is connected to the bracket 76 by extending the cross wire portion 40a under the retainer 96, so that the retainer 96 engages the top side of portion 40a and clamps the opposite side of cross wire portion 40a against the body 78 at opposite sides of the slot 88. A conventional spring clip 26 is employed to clip the cross wire portion 40b to the strip 90, which is of a width about the same as or only slightly greater than the diameter of cross wire portion 40b.

It can thus be seen that the bracket 76 may be preassembled with the main spring member 28 and subsequently mounted on the frame rail 14. If desired, the bracket 76, which may likewise be formed of either metal or plastic, may be first mounted on the frame rail, by means of the staple 82 and then subsequently attached to the spring member 28. When the bracket 76 is mounted, the ends 86 of the flanges 84 engage the inner sides of the frame rail so that the flanges 84 function as braces to brace the bracket 76 against downward deflection when the main spring member 28 is loaded.

Figure 6:
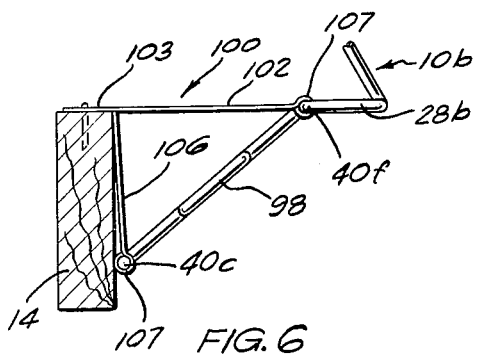
FIGURE 6 is a foreshortened sectional view, illustrated similarly to FIGS. 1 and 4, showing another modified assembly of this invention.
Figure 7:
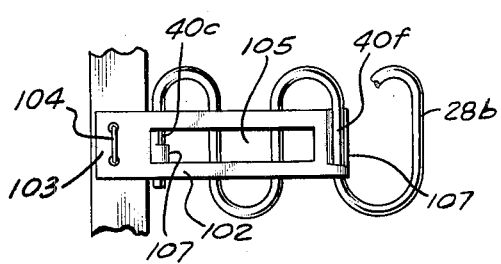
FIGURE 7 is a fragmentary top view of the structure illustrated in FIG. 6.

In the spring assembly 10b illustrated in FIGS. 6 and 7, a main spring member 28b is used which is similar to the main spring member 28 previously described, but which differs therefrom in that at its front end, the main spring member 28b has a downwardly and forwardly inclined section 98, formed of zigzag wire, and having cross wire portions 40e and 40f disposed at the ends of the section 98. The main spring member 28b is attached to the front frame rail 14 by a bracket 100 which is likewise formed from a single rectangular body 102 which can be formed of metal or plastic. The body 102 has a supporting end portion 103 which is secured to the top side of the frame rail 14 by a staple 104. A slot 105 is punched out of the body 102 so as to form a downwardly extending leg 106 which is integral at its upper end with the bracket supporting portion 103.

Figure 10:
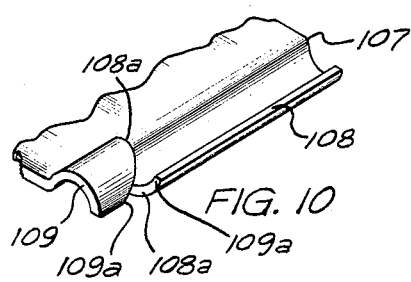
FIGURE 10 is a fragmentary perspective view of a portion of a bracket illustrating the shape of the spring attaching sections of the mounting brackets illustrated in FIGS. 6 to 9 inclusive.

The leg 106 is formed at its terminal end with a spring attaching section 107 which is illustrated in greater detail in FIG. 10. The section 107 consists of a pair of relatively reversely curved generally U-shaped arms 108 and 109 which are integral with the leg 106 and have a radius of curvature substantially the same as the main spring wire in cross section. The arms 108 and 109 are formed by first forming a notch in the end of the leg 106 so as to separate the sections 108 and 109, and then forming the arms 108 and 109 to the desired shape. The notch causes the adjacent ends 108a of the arms 108 and 109 to curve away from each other at their outer ends 109a to enable forcing of a spring wire portion between the ends 108a to a supported position on the arms. The body 102 is also provided with another attaching section 107 at the end of the slot 105 opposite the end at which the supporting portion 103 is located. The bracket 100 can also be preassembled with the main spring member 28b by inserting the connecting wire portions 40e and 40f in the wire attaching sections 107 at the ends of the leg 106 and the body 102, respectively. A connecting wire portion may be either moved endwise into a supported relation on a wire attaching section 107, in which opposite sides of the connecting wire portion are gripped by the U-shaped arms 108 and 109, or the connecting wire portion may be snapped onto the attaching section 107 by forcing the connecting wire portion through the narrow space between the ends 108a of the arms.

Figure 8:
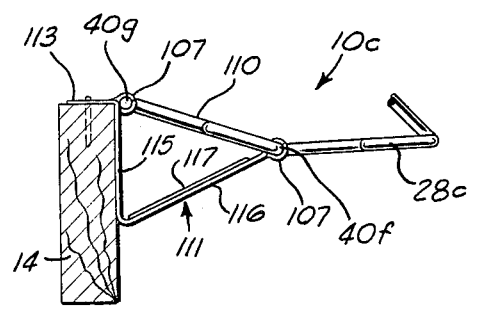
FIGURE 8 is a foreshortened sectional view, illustrated similarly to FIGS. 1, 4 and 6, showing another modified form of the spring assembly of this invention.
Figure 9:
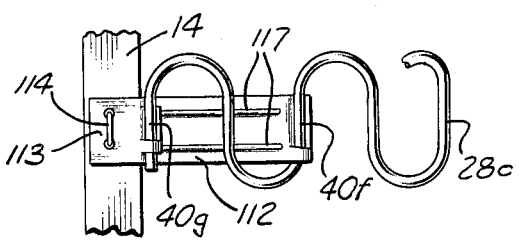
FIGURE 9 is a fragmentary top view of the structure illustrated in FIG. 8.

In the spring assembly 10c illustrated in FIGS. 8 and 9, a main spring member 28c, similar to the main spring members previously described but differing therefrom in that it terminates in an upwardly and forwardly inclined section 110, is supported on a cantilever support bracket 111 mounted on the front frame rail 14. The main spring end section 110 is formed of zigzag wire and has an endmost cross wire portion 40g and a cross wire portion 40f spaced therefrom. The bracket 111 is formed from a rectangular body 112, of metal or plastic, which is shaped so that it has a flat rectangular end portion 113 secured to the top side of the frame rail 14 by a staple 114. The body 112 has a substantially upright leg 115 which extends downwardly from the supporting portion 113 along the inner side of the rail 14, and a leg 116 which extends upwardly and rearwardly from the lower end of the leg 115. The leg 116 is formed with raised stiffening ribs 117, which extend lengthwise of the leg 116 and enhance the bracing function of leg 116. A wire attaching section 107 is punched out of the leg 115, adjacent the upper end thereof, so that it is integral with the leg 115 and the supporting portion 113 and is located adjacent the juncture thereof. Likewise, a wire attaching section 107 is formed at the terminal end of the leg 116.

The bracket 111 can be preassembled with the main spring member 28c by attaching the cross wire portions 40g and 40f to the attaching sections 107 at the upper end of the leg 115 and the terminal end of the leg 116, respectively, in the manner previously described in connection with the attachment of the bracket 100 to the main spring member 28b. The bracket 111 is then attached to the front frame rail 14 by stapling the supporting portion 113 to the top side of the frame rail 14 so that the leg 115 is positioned in engagement with the inner side of the rail 14.

Figure 12:
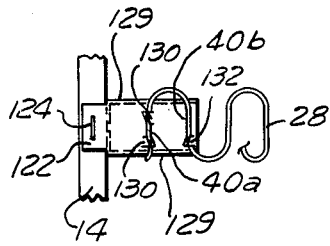
FIGURE 12 is a fragmentary top view of the structure illustrated in FIG. 11.
Figure 11:
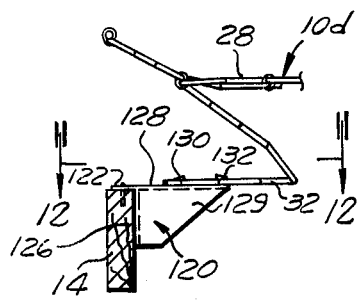
FIGURE 11 is a fragmentary foreshortened sectional view, illustrated similarly to FIGS. 1, 4, 6 and 8 of still another modified form of the spring assembly of this invention.

In the modified form 10d of the spring assembly shown in FIGS. 11 and 12, a main spring member 28 is assembled at its front end with a bracket 120 and at its rear end may be cantilever supported in any one of ways shown in FIGS. 1, 4, 6 and 8 or it may be otherwise supported. The cantilever support bracket 120 consists of a body 128, formed of metal or plastic, which has a rectangular end supporting portion 122 secured, such as by a staple 124, to the top side of the front frame rail 14. The body 128 has a pair of downturned transversely spaced flanges 129, which at their front edges are formed with extensions 126 that extend inwardly toward each other and are positioned in engagement with the inner side of rail 14. The top side of the bracket 120 is substantially horizontal and is in substantially the plane of the top side of the rail 14.

The body 128 is provided with upstruck ears or tangs, two of which 130 are substantially aligned and extend in opposite directions, and a third 132 of which is spaced inwardly from and extends toward the ears 130. The bracket 120 can be preassembled with the main spring member 28 by positioning the endmost cross wire portion 40a in engagement with the ears 130 and positioning the adjacent cross wire portion 40b in engagement with the ear 132. The ears can then be bent down to insure clamping of the cross wire portions against the body 128. This two-point assembly of the bracket 120 and the main spring member 28 restrains the front end of the spring member 28 against pivotal movement and provides for a substantially rigid assembly of the spring member 28 with the bracket 120. As a result, when the bracket 120 is mounted on rail 14 as shown in FIG. 11 so that the flanges 129 function as braces, the effective chord distance of the main spring member 28 is shortened by an amount equal to the distance between the front frame rail 14 and the ear 132.

Figure 14:
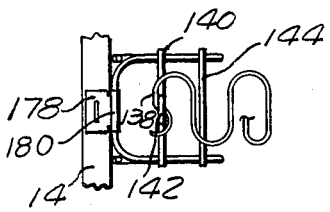
FIGURE 14 is a fragmentary top view of the structure illustrated in FIG. 13.
Figure 13:
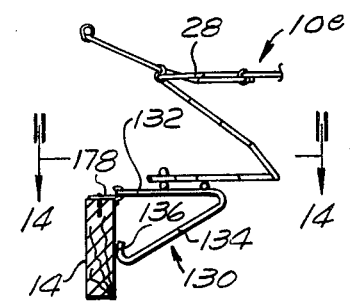
FIGURE 13 is a fragmentary foreshortened sectional view, illustrated similarly to FIGS. 1, 4, 6, 8 and 11, showing yet another modified form of the spring assembly of this invention.

The modified form 10e of the spring assembly illustrated in FIGS. 13 and 14 includes a main spring member 28 and a wire bracket 130 secured to the frame rail 14 by a frame clip 178. The clip 178 is stapled to the frame rail 14 and has a hook portion 180. The wire bracket 130 consists of a single wire member bent so that it has a U-shape top section 132, the bight of which is anchored to the clip hook 180, and downwardly and forwardly inclined leg portions 134 which terminate in upwardly directed ends 136 positioned in engagement with the inner side of the rail 14. Spring supporting wires or bars 140 and 142 are secured to and extend transversely across the top section 132, intermediate the ends thereof.

The bracket 130 is assembled with the main spring member 28 by bending the endmost cross wire portion 138 in the spring 28 through a loop 142 formed on supporting wire 140 to restrain the cross wire portion 138 against vertical movement. A portion of the spring 28 spaced longitudinally from the endmost cross wire portion 138 engages the top side of the other supporting bar 144 in the bracket 130 and is maintained in contact therewith by the loads applied to the spring member 28. As a result, a two-point support on the bracket 130 for the spring member 28 is provided.

From the above description it is seen that this invention provides spring assemblies consisting of elongated wire main spring members and cantilever support brackets secured to the ends of the main spring members. Each bracket supports the adjacent end of the spring at two longitudinally spaced points so as to restrain the spring end against pivoting and provide a firm support for the spring. Most forms of the bracket of this invention are formed from a single piece of sheet material, to thereby facilitate their manufacture at an economical cost, and the construction of the brackets so that they can be preassembled with the main spring members facilitates assembly of the seating structures. This preassembly is possible because of the two point connection of each bracket to a spring member end and when a spring assembly is mounted on the rails the main spring member does not contact the rails. Although the spring assemblies are shown as forming the seat portions of seating structures, they are also useful informing seat backs.

It will be understood that the spring assemblies which are herein disclosed and described are presented for purposes of explanation and illustration and are not intended to indicate limits of the invention, the scope of which is defined by the following claims.

What is claimed is:

1. An attaching bracket for zigzag wire springs having substantially parallel longitudinally spaced cross wire portions, said bracket comprising a unitary body formed from a rectangular sheet material and having a flat end portion adapted to be supported, means forming a pair of aligned openings on the opposite end portion of said body adapted to have a cross wire portion extended therethrough, an upstruck tang on said opposite end portion engageable with another cross wire portion, and a brace leg extending from said opposite end portion in an angular relation therewith.

2. In a seating structure having front and rear horizontally spaced frame rails each of which has an inner side and a top side, a spring assembly comprising a main spring member formed of zigzag wire and being of a length to substantially span the distance between said rails, said main spring member having longitudinally spaced cross wire portions connected by connecting wire portions and a pair of end portions at least one of which is spaced inwardly from the inner side of one of said frame rails, a cantilever support for said one main spring member end portion, said support comprising a bracket connected to the top side of said one of said rails and bracingly engaged with the inner side of said one rail, said bracket extending toward the other one of said rails and having horizontally spaced spring supporting sections engaged with longitudinally spaced portions of said main spring member, at least one of said supporting sections being connected to one of said cross wire portions for assembly therewith prior to mounting on said one rail.

3. In a seating structure according to claim 2 wherein said bracket is comprised of a one piece body having one end portion secured to the top side of said one rail, means forming aligned openings on said body adjacent the opposite end thereof and having the cross wire portion at one end of said main spring extended therethrough, a bendable tang on said body disposed adjacent said openings and engaged with the cross wire portion in said main spring member adjacent said one cross wire portion, said body having an opening therein and a leg formed by the material removed to provide said opening, said leg being integral with said body and being inclined downwardly from said body adjacent said opposite end thereof into engagement with the inner side of said one rail, said leg being of generally V-shape in cross section, and downturned flanges on said body having their ends spaced from said one end of said body and engaged with the inner side of said one rail.

4. In a seating structure according to claim 2 wherein said bracket is comprised of a one piece body having one end secured to the top side of said one rail, said body having a spring connecting strip at the opposite end thereof, clip means securing one of said main spring cross wire portions to said connecting strip, a bendable retainer on said body disposed between the ends thereof and clampingly engaged with the cross wire portion in said main spring member adjacent said one cross wire portion, said body having downturned brace flanges arranged on opposite sides of said retainer and said strip, said flanges being bracingly engaged with the inner side of said one rail.

5. In a seating structure according to claim 2 wherein said bracket is comprised of a one piece longitudinally extending body having one end secured to the top side of said one rail, said body extending longitudinally from said one end toward said other rail, integral spring attaching sections on said body spaced longitudinally of said body from each other and spaced from said one end thereof, each of said attaching sections consisting of reversely curved generally U-shape arms disposed in an end-to-end closed spaced relation, each of said attaching sections having a spring cross wire portion positioned therein so that said arms clampingly engage opposite sides thereof, and means on said body engaged with the inner side of said one rail.

6. In a seating structure according to claim 2 wherein said bracket is comprised of a one piece body having a flat end portion secured to the top side of said one rail, spaced apart spring attaching means on said body adjacent the opposite end thereof clampingly engaged with the cross wire portion at one end of said main spring member and the cross wire portion in said main spring member adjacent said end cross wire portion, said body having downturned flanges disposed on transversely opposite sides thereof engaged with the inner side of said rail so as to brace said body against pivoting under load.

7. In a seating structure according to claim 2 wherein said bracket includes a clip secured to the top side of said one frame rail and a wire body hooked to said clip, said body having one portion extending from said clip toward said other rail and another portion inclined downwardly from said one portion into engagement with the inner side of said one rail, said body having a pair of spaced wires extending transversely of the first portion thereof and constituting said supporting sections, the one of said wires closest to said clip being connected to the endmost cross wire portion in said main spring member and the other one of said wires being supportingly engageable with a portion of said main spring member spaced from said endmost cross wire portion.

8. In a seating structure according to claim 2 wherein said bracket is comprised of a one piece longitudinally extending body having a portion at one end secured to the top side of said one rail, said body extending longitudinally from said one end toward said other rail and having an opposite end spaced horizontally from said one rail, integral spring attaching sections on said body spaced longitudinally of said body from each other and spaced from said one end thereof, each of said attaching sections consisting of reversely curved generally U-shaped arms disposed in an end-to-end closed spaced relation, each of said attaching sections having a spring cross wire portion positioned therein so that said arms clampingly engage opposite sides thereof, said body having a leg extending downwardly from and formed integral with said one end portion, one of said attaching sections being located at said opposite end of said body, and the other one of said attaching sections being located at the lower end of said leg in engagement with the inner side of said one rail.

9. In a seating structure according to claim 2 wherein said bracket is comprised of a one piece longitudinally extending body having a portion at one end secured to the top side of said one rail, said body having a first leg extending downwardly from said one end portion along the inner side of said rail and a second leg extending upwardly and rearwardly from the lower end of said one leg toward said other rail, integral spring attaching sections on said body spaced longitudinally of said body from each other and spaced from said one end thereof, each of said attaching sections consisting of reversely curved generally U-shape arms disposed in an end-to-end closed spaced relation, each of said attaching sections having a spring cross wire portion positioned therein so that said arms clampingly engage opposite sides thereof, one of said attaching sections being located substantially at the juncture of said one end portion and said first leg, and the other attaching section being located at the opposite end of said body.

10. A spring assembly adapted to be extended between and supported on a pair of frame rails spaced a predetermined distance apart, said assembly comprising a main zigzag spring member having a plurality of cross wire portions arranged at the ends of said spring member, a pair of spring supporting brackets for the ends of said spring member, each of said brackets including means attached to a pair of the cross wire portions at one end of said spring, supporting means on each of said brackets spaced from the attaching means thereon adapted to be secured to a rail, the spacing between said supporting means on said brackets corresponding substantially to said predetermined distance, and brace means on each bracket engageable with the inner side of a rail on which said bracket is supported.

11. A mounting bracket for a zigzag wire spring member having substantially parallel longitudinally spaced cross wire portions one of which is disposed at one end of said spring member, said bracket comprising a unitary body having a supporting portion at one end, spring engaging means on said body spaced from said supporting portion and engageable with the spring member cross wire portion adjacent to said one cross wire portion, a pair of substantially aligned spring retainer means on said body disposed generally between said supporting portion and said spring engaging means, said retainer means being engageable with spaced portions of said one cross wire portion.

12. A mounting bracket for a zigzag wire spring member having substantially parallel longitudinally spaced cross wire portions one of which is disposed at one end of said spring member, said bracket comprising a unitary body having a supporting portion at one end, spring engaging means on said body spaced from said supporting portion and engageable with the spring member cross wire portion adjacent to said one cross wire portion, a pair of substantially aligned spring retainer means on said body disposed generally between said supporting portion and said spring engaging means, said retainer means being engageable with spaced portions of said one cross wire portion, and an inclined brace leg integral with said body and spaced from said supporting portion, said leg being bendable with respect to said body to adjust the inclination of said leg relative to said body.

13. A mounting bracket for a zigzag wire spring member having substantially parallel longitudinally spaced cross wire portions one of which is disposed at one end of said spring member, said bracket comprising a unitary body having a pair of ends and a substantially flat supporting portion at one end, spring engaging means on said body spaced from said supporting portion and engageable with the spring member cross wire portion adjacent to said one cross wire portion, a pair of substantially aligned spring retainer means on said body disposed generally between said supporting portion and said spring engaging means, said retainer means being engageable with spaced portions of said one cross wire portion, an inclined brace leg integral with said body and spaced from said supporting portion, and stiffening flanges on said body extending in a direction from end to end thereof.

14. A bracket for mounting a zigzag wire spring member having substantially parallel longitudinally spaced cross wire portions one of which is disposed at one end of said spring member on a frame rail having an inner side, said bracket comprising a unitary body having a pair of ends, a supporting portion at one end of said body adapted to be secured to said frame rail, said body having a portion adjacent the opposite end engageable with one side of the spring member cross wire portion adjacent to said one cross wire portion, means providing a pair of substantially aligned openings in said body through which said one cross wire portion can be extended so that said body engages the side thereof opposite the side of said adjacent cross wire portion engaged by the portion of said body adjacent said opposite end thereof, said openings being disposed generally between said body end portions, an inclined brace leg constituting an integral part of said body and extending from said opposite end portion, said brace leg having a free end engageable with said frame rail inner side.

References Cited by the Examiner

UNITED STATES PATENTS

| | | | |
|---|---|---|---|
| 624,723 | 5/1899 | Allis | 248—248 |
| 2,429,586 | 10/1947 | Rompre | 248—248 |
| 2,593,831 | 4/1953 | Bank | 267—111 |
| 2,652,885 | 9/1953 | Engel | 267—103 |
| 2,659,417 | 11/1953 | Handren | 267—107 X |

ARTHUR L. LAPOINT, *Primary Examiner.*